US009495665B2

(12) United States Patent
Cole et al.

(10) Patent No.: US 9,495,665 B2
(45) Date of Patent: *Nov. 15, 2016

(54) DELIVERING ELECTRONIC MEETING CONTENT

(71) Applicant: International Business Machines Corporation, Armonk, NY (US)

(72) Inventors: Stephen W. Cole, Cambridge, MA (US); Jo Ann Jordan, North Reading, MA (US); Patrick J. O'Sullivan, Ballsbridge (IE); Stephen Ryan, Mulhuddart (IE); Jolene Rowlands Staruch, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,090

(22) Filed: Sep. 24, 2013

(65) Prior Publication Data

US 2014/0188540 A1 Jul. 3, 2014

Related U.S. Application Data

(63) Continuation of application No. 13/728,095, filed on Dec. 27, 2012.

(51) Int. Cl.
| | |
|---|---|
| *G06F 15/16* | (2006.01) |
| *G06F 3/048* | (2013.01) |
| *G06F 17/00* | (2006.01) |
| *G06F 3/00* | (2006.01) |
| *G06Q 10/10* | (2012.01) |
| *G06F 3/01* | (2006.01) |

(52) U.S. Cl.
CPC ............. *G06Q 10/1095* (2013.01); *G06F 3/01* (2013.01)

(58) Field of Classification Search
CPC .......... G06F 15/16; G06F 3/048; G06F 17/00; G06F 3/00
USPC ....................................................... 709/204
See application file for complete search history.

(56) References Cited

U.S. PATENT DOCUMENTS

| | | | |
|---|---|---|---|
| 6,088,026 A | 7/2000 | Williams | |
| 6,564,246 B1 | 5/2003 | Varma et al. | |
| 7,251,670 B1 * | 7/2007 | Day ................. | G06F 17/30212 707/638 |
| 8,271,889 B1 * | 9/2012 | Beckert et al. ............... | 715/762 |
| 2003/0110218 A1 | 6/2003 | Stanley | |
| 2003/0115189 A1 * | 6/2003 | Srinivasa et al. ................. | 707/3 |
| 2004/0010629 A1 | 1/2004 | Diesel et al. | |
| 2004/0266412 A1 * | 12/2004 | Maes ..................... | G06Q 10/10 455/414.4 |
| 2006/0073810 A1 * | 4/2006 | Pyhalammi et al. ......... | 455/407 |
| 2007/0143376 A1 * | 6/2007 | McIntosh ..................... | 707/205 |

(Continued)

*Primary Examiner* — Jennifer To
*Assistant Examiner* — Hugo Molina
(74) *Attorney, Agent, or Firm* — Brian J. Colandreo, Esq.; Jeffrey T. Placker, Esq.; Holland & Knight LLP

(57) ABSTRACT

A method, computer program product, and system for delivering content in an electronic meeting. An electronic meeting is associated with a calendar appointment. Content associated with the electronic meeting is identified. A portion of the content is provided to a computing device associated with a user based upon, at least in part, receiving an indication that the user intends to participate in the electronic meeting, wherein the indication is associated with the calendar appointment.

5 Claims, 3 Drawing Sheets

(56) References Cited

U.S. PATENT DOCUMENTS

| | | |
|---|---|---|
| 2007/0180084 A1* | 8/2007 | Mohanty ............. G06F 11/1464 709/223 |
| 2007/0185956 A1* | 8/2007 | Ogle et al. .................... 709/204 |
| 2008/0005233 A1* | 1/2008 | Cai .................. H04L 29/06027 709/204 |
| 2008/0022209 A1* | 1/2008 | Lyle .............................. 715/730 |
| 2009/0063945 A1 | 3/2009 | Bhogal et al. |
| 2009/0222747 A1* | 9/2009 | May et al. .................... 715/764 |
| 2010/0088430 A1* | 4/2010 | Ton et al. ..................... 709/248 |
| 2010/0189241 A1* | 7/2010 | Miller ..................... H04M 3/56 379/202.01 |
| 2010/0235216 A1 | 9/2010 | Hehmeyer et al. |
| 2010/0235894 A1* | 9/2010 | Allen et al. ........................ 726/7 |
| 2010/0241663 A1* | 9/2010 | Huang et al. ................. 707/770 |
| 2011/0138014 A1 | 6/2011 | Arnett et al. |
| 2011/0271129 A1* | 11/2011 | Flannagan .......... H04L 12/1822 713/323 |
| 2012/0089928 A1 | 4/2012 | Bryant et al. |
| 2013/0339431 A1* | 12/2013 | Yannakopoulos .. H04L 12/1827 709/204 |
| 2014/0059608 A1* | 2/2014 | Beattie, Jr. et al. ............ 725/39 |

\* cited by examiner

000
DELIVERING ELECTRONIC MEETING CONTENT

RELATED APPLICATIONS

The subject application is a continuation application of U.S. patent application Ser. No. 13/728,095, filed on Dec. 27, 2012, the entire content of which is herein incorporated by reference.

TECHNICAL FIELD

This disclosure relates to electronic meetings.

BACKGROUND

In various situations, individuals and/or groups may participate in electronic meetings. Electronic meetings may be interactions among individuals facilitated by electronic means. For example, electronic meeting applications may facilitate speech-, text-, and/or video-enabled communication sessions among a plurality of individuals. Certain electronic meetings may include presentation of audio-visual (and/or other) content to meeting participants in addition/as an alternative to speech, text, and/or video communication. For example, certain electronic meeting applications may permit meeting participants to view and/or control the presentation of various slides and/or other content.

BRIEF SUMMARY OF THE DISCLOSURE

According to one aspect of the disclosure, a computer-implemented method includes associating, by one or more computing devices, an electronic meeting with a calendar appointment. The method includes identifying, by the one or more computing devices, content associated with the electronic meeting. The method includes providing, by the one or more computing devices, a portion of the content to a computing device associated with a user based upon, at least in part, receiving an indication that the user intends to participate in the electronic meeting, wherein the indication is associated with the calendar appointment.

One or more of the following features may be included. Providing the portion of the content may occur prior to the start of the electronic meeting. Providing the portion of the content may occur during a time of low load for a server associated with providing the portion of the content. The indication that the user intends to participate in the electronic meeting may be received after the start of the electronic meeting. The method may include providing, during the electronic meeting, to the computing device associated with the user, a truncated instruction set for the display, during the electronic meeting, of a view of the portion of the content. The method may include providing, to the computing device associated with the user, an update to the portion of the content. The provided portion of content may be stored by a calendar application associated with the calendar appointment. The provided portion of content may be stored as part of one or more of an activities server, an online community, a wiki, and a team room.

According to another aspect of the disclosure, a computer program product resides on a computer readable storage medium that has a plurality of instructions stored on it. When executed by a processor, the instructions cause a processor to perform operations including associating an electronic meeting with a calendar appointment. The operations include identifying content associated with the electronic meeting. The operations include providing a portion of the content to a computing device associated with a user based upon, at least in part, receiving an indication that the user intends to participate in the electronic meeting, wherein the indication is associated with the calendar appointment.

One or more of the following features may be included. Providing the portion of the content may occur prior to the start of the electronic meeting. Providing the portion of the content may occur during a time of low load for a server associated with providing the portion of the content. The indication that the user intends to participate in the electronic meeting may be received after the start of the electronic meeting. The operations may include providing, during the electronic meeting, to the computing device associated with the user, a truncated instruction set for the display, during the electronic meeting, of a view of the portion of the content. The operations may include providing, to the computing device associated with the user, an update to the portion of the content. The provided portion of content may be stored by a calendar application associated with the calendar appointment. The provided portion of content may be stored as part of one or more of an activities server, an online community, a wiki, and a team room.

According to another aspect of the disclosure, a computing system includes one or more processor devices and one or more memory architectures coupled with the one or more processor devices. The one or more processor devices are configured to associate an electronic meeting with a calendar appointment. The one or more processor devices are configured to identify content associated with the electronic meeting. The one or more processor devices are configured to provide a portion of the content to a computing device associated with a user based upon, at least in part, receiving an indication that the user intends to participate in the electronic meeting, wherein the indication is associated with the calendar appointment.

One or more of the following features may be included. Providing the portion of the content may occur prior to the start of the electronic meeting. Providing the portion of the content may occur during a time of low load for a server associated with providing the portion of the content. The indication that the user intends to participate in the electronic meeting may be received after the start of the electronic meeting. The one or more processor devices may be configured to provide, during the electronic meeting, to the computing device associated with the user, a truncated instruction set for the display, during the electronic meeting, of a view of the portion of the content. The one or more processor devices may be configured to provide, to the computing device associated with the user, an update to the portion of the content. The provided portion of content may be stored by a calendar application associated with the calendar appointment. The provided portion of content may be stored as part of one or more of an activities server, an online community, a wiki, and a team room.

According to one aspect of the disclosure, a computer-implemented method includes associating, by one or more computing devices, an electronic meeting with a calendar appointment. The method includes identifying, by the one or more computing devices, content associated with the electronic meeting. The method includes providing, prior to the start of the electronic meeting, by the one or more computing devices, a portion of the content to a computing device associated with a user based upon, at least in part, receiving an indication that the user intends to participate in the electronic meeting, wherein the indication is associated with the calendar appointment.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
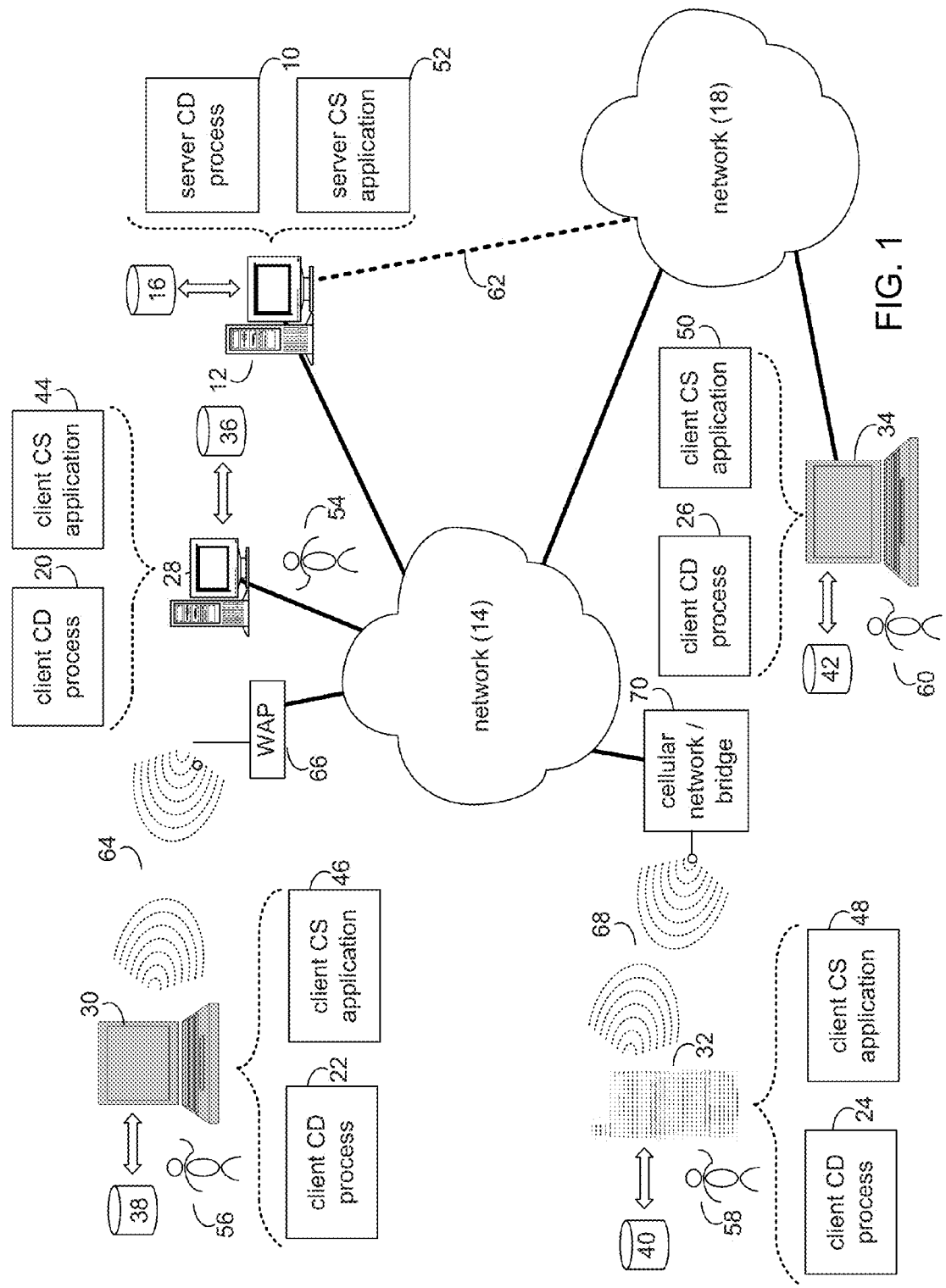
FIG. 1 is a diagrammatic view of a content delivery process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Individuals may participate (actively and/or passively) in various electronic meetings, which may include presentation of and/or interaction with various types of content. For example, individuals may participate in an electronic meeting in which they view slides (and/or various other content types) being presented by one or more presenters and may, in certain embodiments, comment on and/or otherwise interact with the slides (and/or other content types).

Participation by individuals in electronic meetings may be facilitated by an electronic meeting ("EM") application (or process). For example, an EM application may facilitate various users (including, for example, meeting presenters and/or other administrators) connecting to a particular electronic meeting and viewing and/or otherwise interacting with various meeting content. In certain embodiments an EM application may simultaneously (or near-simultaneously) facilitate multiple electronic meetings, each with distinct participants and/or content.

In certain embodiments, participation in an electronic meeting may be associated with an appointment or other aspect of a Calendar and Scheduling ("CS") application (or process) (also sometimes referred to as a calendar application). A CS application may be an application that facilitates management of various calendar events. For example, a CS application (or process) may facilitate sending, receiving, accepting, rejecting, and/or countering invitations to electronic meetings (and/or other events). As such, for example, a participant (and/or other user, application, or process) may provide to desired participants in a future electronic meeting, using a CS application (or process), invitations to participate in the future meeting. The desired participants may then, in certain embodiments, through a CS application (or process) accept, reject, and/or counter the invitation (and so on), thereby indicating, for example, their intention to participate (or not participate) in the future meeting. In certain embodiments, a CS application (or process) may be associated with one or more other communication (and/or other) applications (or processes). For example a CS application may be part of an EM application, an email and/or other communication application, and so on.

In certain instances, the network, bandwidth and other costs associated with providing meeting content through an EM application (and/or an associated application or process) may be substantial. For example, servers associated with EM applications and/or content (e.g., servers storing EM content) may need to push content to tens of thousands (or more) attendees of thousands (or more) simultaneous electronic meetings. This may represent significant server load if, for example, content is stored remote from participant computing devices and content is pushed to participant computing devices as it is displayed during the electronic meeting (e.g., in the form of a full bitmap of the content or a bitmap representing the difference between currently displayed and previously displayed content).

Lower speed internet, cell-phone and other electronic connections may also represent issues associated with delivery of electronic meeting content to participants. For example, if content is stored remote from participant computing devices and content is pushed to participant computing devices as it is displayed during the electronic meeting lower speed connections may result in undesirable lag time (and/or failure) in the display of meeting content to certain participants. Similar issues may also arise from unreliable, intermittent or otherwise non-optimal connections. For example, portions of a bitmap representation of meeting content may be delayed and/or lost due to intermittent connectivity of a user (e.g., because the user is utilizing a low-reliability cellular connection).

A Content Delivery ("CD") process may address these and other issues. In certain embodiments, a CD process may operate as part of and/or in conjunction with various EM applications (or processes) and/or various CS applications (or processes) in order to facilitate delivery of content associated with one or more electronic meetings, which meetings may in turn be associated with various aspects and/or functionality of a CS application (or process) (e.g., through invitations associated with the meetings) and/or an EM application (or process) (e.g., through association of content with a particular electronic meeting).

Referring now to FIG. 1, a CD process may be coupled to a computer or computer network. For example, server CD process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server CD process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client CD processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CEO, Red Hat® Linux®, or a custom operating system.

The instruction sets and subroutines of client CD processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the CD process may be a server-side process (e.g., which may be implemented via server CD process 10), in which all of the functionality of the CD process may be executed on a server computer (e.g., server computer 12). In an embodiment, the CD process may be a client-side process (e.g., which may be implemented via one or more of client CD processes 20, 22, 24, 26), in which all of the functionality of the CD process may be executed on a client computing device (e.g., one or more of client electronic devices 28, 30, 32, 34). In an embodiment, the CD process may be a hybrid server-client process (e.g., which may be implemented by server CD process 10 and one or more of client CD processes 20, 22, 24, 26), in which at least a portion of the functionality of the CD process may be implemented via server computer 12 and at least a portion of the functionality of the CD process may be implemented via one or more client computing devices (e.g., one or more of client electronic devices 28, 30, 32, 34).

In certain embodiments, a CD process may be a standalone process. In certain embodiments, a CD process may operate as part of, or in conjunction with, one or more other processes and/or may include one or more other processes. For example, in certain embodiments, a CD process may be included in (or may operate in conjunction with) a CS application (or process). Additionally/alternatively, in certain embodiments, a CD process may be included in (or may operate in conjunction with) an EM application (or process) and/or another application for conferencing, communication, or other types of collaboration.

A CS application (or process) may operate (and/or reside) on a client device (e.g., client CS application 44, operating on client electronic device 28; client application CS 46, operating on client electronic device 30; client CS application 48, operating on client electronic device 32; or client CS application 50, operating on client electronic device 34). A client CD process (e.g., client CD process 20) or a server CD process (e.g., server CD process 10) may be in communication with a client CS application (e.g., client CS application 44) or may be part of a client CS application.

A CS application may additionally/alternatively operate (and/or reside) on a server device (e.g., server CS application 52, operating on server computer 12 or another server CS application (not shown), operating on another server computer (not shown)). A server CD process (e.g., server CD process 10) or a client CD process (e.g., client CD process 20) may be in communication with a server CS application (e.g., server CS application 52) or may be a part of a server CS application.

A EM application (or process) may operate (and/or reside) on a client device (not shown). A client CD process (e.g., client CD process 20) or a server CD process (e.g., server CD process 10) may be in communication with a client EM application (not shown) or may be part of a client EM application.

A EM application may additionally/alternatively operate (and/or reside) on a server device (not shown). A server CD process (e.g., server CD process 10) or a client CD process (e.g., client CD process 20) may be in communication with a server EM application (not shown) or may be a part of a server EM application (not shown).

Users 54, 56, 58, 60 may access a CD process in various ways. For example, these users may access server CD process 10 directly through the device on which a client process (e.g., client CD processes 20, 22, 24, 26) is executed, namely client electronic devices 28, 30, 32, 34. Users 54, 56, 58, 60 may access server CD process 10 directly through network 14 and/or through secondary network 18. Further, server computer 12 (i.e., the computer that executes server CD process 10) may be connected to network 14 through secondary network 18, as illustrated with phantom link line 62. Users 54, 56, 58, 60 may also access a client or server CS application in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client CD process 20 will be described for illustrative purposes. It will be understood that client CD process 20 may, for example, interact and/or communicate with a server CD process such as server CD process 10 and/or may be executed within one or more applications that allow for communication with other server and/or client CD processes. This is not intended to be a limitation of this disclosure, as other configurations are possible (e.g., CD process 20 may include stand-alone client processes and/or stand-alone server processes). For example, some implementations may include one or more of client CD processes 22, 24, 26 or server CD process 10 in place of or in addition to client CD process 20.

Figure 2:
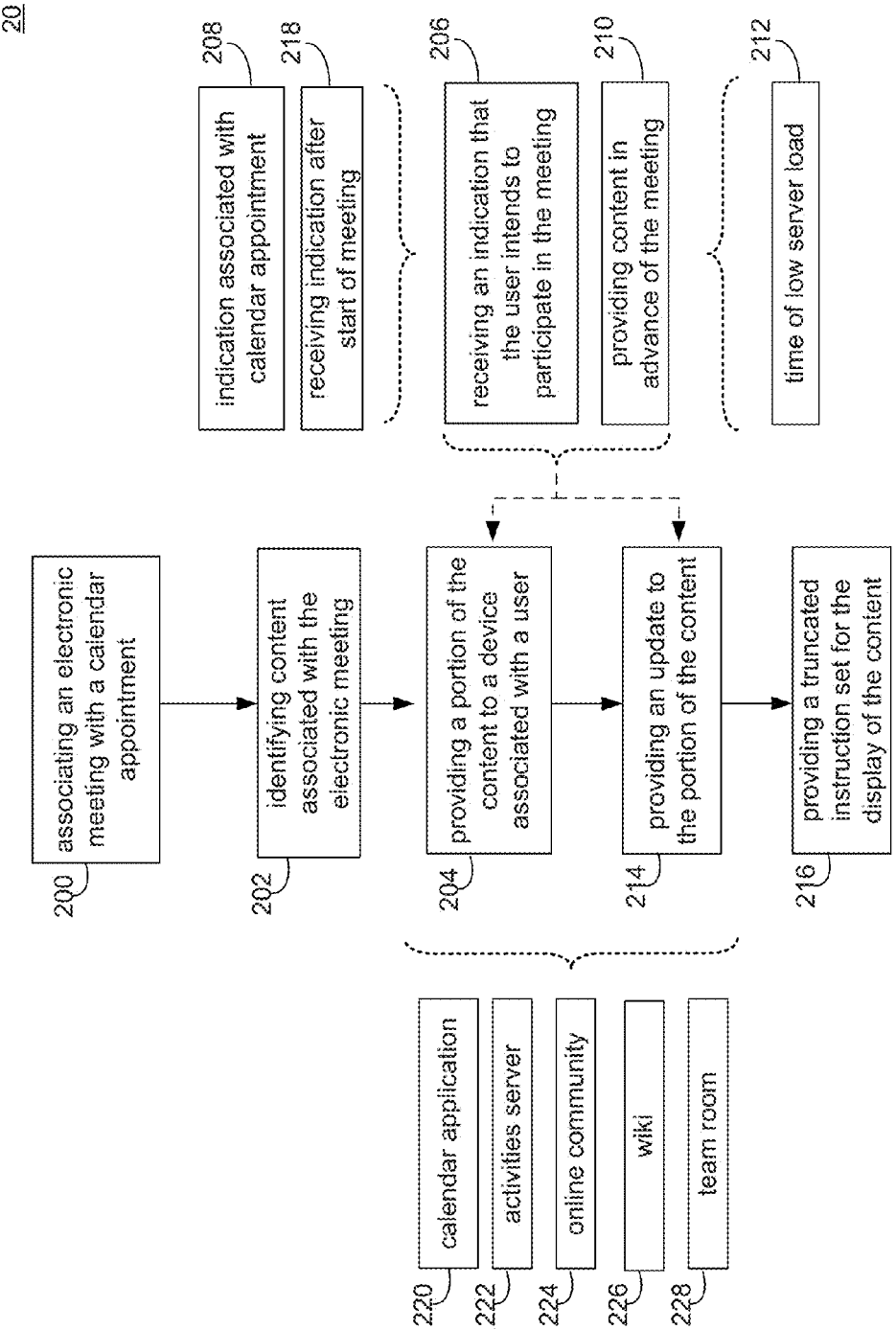
FIG. 2 is a flowchart of a process executed by the content delivery process of FIG. 1.

Referring now also to FIG. 2, there is shown a diagrammatic view of an example process that may be implemented by a CD process, e.g., client CD process 20. Client CD process 20 may associate 200 an electronic meeting with a calendar appointment. A calendar appointment may be an electronic record indicating a particular date, time and/or duration for a particular event or occurrence. In certain embodiments, a calendar appointment may be created through, recorded by, stored by, and/or otherwise facilitated by a CS application (or process). For example, in conjunction with a CS application (or process), CD process 20 may create and/or modify a calendar appointment associated with an electronic meeting, wherein the calendar appointment may reflect the scheduled time of the meeting, various invited participants, various presenters and/or other administrators, materials, links, and so on associated with the meeting, and so on.

CD process 20 may identify 202 content associated with the electronic meeting. For example, CD process 20 may identify 202 content that an administrator has indicated will be presented to participants during an electronic meeting, content that may be relevant to the subject matter of the electronic meeting (e.g., background materials), and so on. In certain embodiments, CD process 20 may identify 202 content associated with an electronic meeting based upon association of that content with a calendar appointment associated with the meeting. For example, a moderator may associate a presentation (and/or other content) with a calendar appointment by linking the presentation (and/or other content) to a record of the calendar appointment (e.g., via and/or within a CS application (or process)).

CD process 20 may provide 204 a portion of the content associated with the electronic meeting to a computing device associated with a user. For example, utilizing a server associated with an EM application (or process), a CS application (or process) and/or other application (or process), CD process 20 may effect the transmission of data representing a portion of identified 202 meeting content to one or more computing devices associated with various users. For example, content associated 200 with an electronic meeting may be stored by (or otherwise accessible to) a server computer associated with one or more of CD process 20, an EM application (or process) associated with the relevant meeting, a CS application (or process) associated with the relevant meeting, and so on. As such, for example, in certain embodiments CD process 20 may provide 204 a portion of the content by causing such a server to transmit the portion of the content to another computing device (e.g., a user's desktop device, a user's smart-phone, a shared storage device associated with various users and distinct from the originating server, and so on). CD process 20 may provide 204 the portion of content to a particular storage location, such as a particular cache of a computing device associated with the user (e.g., a cache associated with a local CS application or local execution of a remote CS application, a cache associated with a web browser, and so on).

In certain embodiments, CD process 20 may provide 204 a portion of content for a scheduled electronic meeting (e.g., a portion of a presentation) to confirmed participants in the meeting. For example, in certain embodiments CD process 20 may provide 204 a portion of the content to a user's (and/or another) computing device based upon, at least in part, receiving 206 an indication that the user intends to participate in the electronic meeting. An indication that a user intends to participate in a meeting may take a variety of forms. For example, in certain embodiments the indication may be associated 208 with the calendar appointment. For example, CD process 20 may receive 206 an indication of a user's intent to participate in a meeting based upon the user accepting an invitation to the meeting, wherein the invitation may be facilitated by a CS (and/or other) application or process. In certain embodiments CD process 20 may additionally/alternatively receive 206 an indication based upon the user joining the meeting (e.g., joining the meeting in progress without previously accepting any associated calendar invitation), signing up for the meeting via an electronic roster, sending an email or other message to an organizer of the meeting, and so on.

In certain embodiments a calendar appointment (i.e., an appointment with which an electronic meeting is associated 200) may be a shared appointment and/or may be associated with a shared calendar. (It will be understood that the resources and/or information associated with a shared calendar may be associated with, editable by, and/or viewable or otherwise accessible by multiple users.) As such, for example, in certain embodiments, CD process 20 may provide 204 a portion of content to a storage repository (e.g., a local cache, a wiki, a network drive, and so on) associated with a shared appointment and/or a shared calendar, which content may then be accessed from the storage repository by multiple participants based upon the multiple participants also being associated with the shared calendar/appointment (e.g., as invitees to the electronic meeting represented by the shared appointment). This may be advantageous, in certain embodiments, as it may facilitate CD process 20 providing 204 a portion of content to a single repository (i.e., a repository associated with the shared calendar/appointment) for shared access by multiple meeting participants (e.g., participants among whom the calendar/appointment is shared). As such, for example, this configuration may facilitate CD process 20 providing 204 content only once for a number of meeting participants.

In certain embodiments that involve a shared calendar and/or shared calendar appointment, CD process 20 may provide 204 a portion of content to a repository associated with the shared calendar/appointment based upon, at least in part, receiving 206 an indication of the intent of one or more users associated with the shared calendar/appointment to participate in the meeting. In certain embodiments, for example, CD process 20 may provide 204 the portion of content based upon receiving 206 an indication of intent to participate in the meeting from at least one of the users associated with the shared calendar/appointment. In certain embodiments, CD process 20 may provide 204 the portion of content based upon receiving 206 an indication of intent to participate from a different portion of the users associated with the shared calendar/appointment (e.g., all of the users, a threshold number or percentage of users, and so on).

In certain embodiments, providing 204 the portion of the content may include providing 210 the portion of content in advance of the start of the electronic meeting. For example, as also noted above, in certain embodiments a user may indicate an intent to participate in a meeting by accepting a calendar invitation associated with the meeting. In certain embodiments various users may accept such calendar invitations in advance of the start of a particular meeting. For example, an administrator (e.g., using a CS and/or EM application/process) may cause an invitation for a Friday afternoon meeting to be sent to desired participants on Monday morning. Certain of these desired participants may respond (positively or negatively) to the invitation in advance of the meeting, responding, for example, on Monday afternoon, Tuesday, Wednesday, Thursday, Friday morning, and so on. In certain embodiments, where CD process 20 has received 206, in advance of a meeting, such an indication that a user intends to participate in the meeting, CD process 20 may accordingly provide 210 a portion of meeting content to a computing device associated with that user in advance of the start of the meeting.

Providing 210 content in advance of the start of a meeting, in some embodiments, may have various advantages. For example, as also noted above, in certain embodiments CD process 20 may provide 210 the portion of the content during time 212 of low load for a server associated with providing 204 the content. For example, during daytime/business hours demand for network bandwidth, server capacity, and so on may be higher than during nighttime/non-business hours. As such, for example, in order to minimize the cost (e.g., competition for bandwidth utilization, competition for server utilization, monetary costs, etc.) of providing 210 content, CD process 20 may provide 210 content during times 212 of low server load. For example, CD process 20 may receive 206 on Thursday afternoon an indication that a user intends to participate in an electronic meeting on the following Monday morning. CD process 20 may, accordingly, provide 210 content to a device associated with that user at 4 AM on Friday, at noon on Saturday, at 1 AM on Sunday, and so on, in order to reduce competition for limited server, bandwidth and other resources.

In certain embodiments, providing 210 content in advance of a meeting may additionally/alternatively alleviate issues with server overload as well as low, intermittent, and/or otherwise non-optimal connectivity. For example, because users may sometimes participate in electronic meetings using non-optimal connections (e.g., 3G cellular connections, low-bandwidth fixed connections, and so on), attempting to provide content to certain users from an EM application (and/or other) server during the meeting may result in poor user experience (e.g., lag, incomplete transmission, and/or other errors in delivery of content). Similarly, if an EM application (and/or other) server is managing a large number of meetings, each with a large number of participants, it may be more efficient to provide 210 content to at least some of these participants in advance of the meeting, thereby reducing the necessary load on the EM application (and/or other) server. By providing 210 meeting content in advance of a meeting, however, CD process 20 may ensure that content is fully available to participants (even to participants with non-optimal connectivity and/or even in cases of high server load) by the time that content is to be viewed during the meeting.

In certain embodiments, CD process 20 may provide an indicator to a user when content has been provided 204, 210 to a computing device associated with the user. For example, CD process 20 may provide an email or other message indicating that content has been provided 204, 210, may update (or cause to be updated) a calendar appointment (and/or associated invitation) associated with the electronic meeting, may update a meeting roster (e.g., a web-based list of confirmed participants in the meeting) and so on.

In certain embodiments, providing 210 content in advance of a meeting may permit a user to browse the content before the meeting begins, thereby facilitating, for example, more effective and thorough preparation for the meeting and, accordingly, more efficient and useful participation in the meeting. For example, if a user accepts an invitation to a Friday meeting on Tuesday afternoon, CD process 20 may provide 210 content to a computing device associated with the user early Wednesday morning (i.e., during the next available time 212 of low server load) and may provide an indication to the user (e.g., by email, text message, and so on), on Wednesday morning, that the content has been provided 210 for her. Accordingly, in certain embodiments, from Wednesday morning until at least the start (and/or conclusion) of the Friday meeting (and, potentially, thereafter), the user may be able to peruse (and/or otherwise interact with) the provided 210 content. Similarly, in certain embodiments, a user may be able to peruse provided 204, 210 content during the meeting, but in advance of the timing of presentation of that material. For example, if permitted by the moderator (and/or various settings), a user may be able, during a relevant meeting, to look ahead (and/or back) in a presentation that was provided 204, 210 for that meeting, in order to preview (and/or review) the subject matter of future (and/or past) portions of the meeting.

In certain embodiments, early access to content may be limited in various ways. For example, based upon an input by a moderator (e.g., the creator or presenter of the content), content may be available for viewing by users only until the start of the meeting, after which the moderator will assume control over which portion of content may be viewed. For example, where the content includes a presentation, a moderator may specify that confirmed participants may freely view all (or a portion) of the content slides until the start of the meeting, at which point the users may freely view only the current slide (and, potentially, previous slides). In certain embodiments, a moderator may indicate that all content (or a portion of content) should not be viewed by any users in advance of the presentation of that content during the meeting. For example, a slide may have answers to a quiz, secret information, a joke punch line, and so on, for which advance viewing may not be appropriate. As such, CD process 20 may provide 210, for example, an encrypted version of such a portion of content, which may not be accessed without a proper key (i.e., without permission of the moderator).

In certain embodiments, providing 204 content may also facilitate efficient review of content after the associated meeting has concluded. For example, rather than access an EM application (or other) server to obtain content from a concluded meeting, a participant in that meeting may be able to retrieve the provided 204 content for review from a local (or other) repository. In certain embodiments, based, for example, on administrator input, certain provided 204 content may not be made available for review after the conclusion of the meeting. For example, CD process 20 may cause content to be deleted, encrypted, or otherwise made unavailable to certain meeting participants at certain times (e.g., after the meeting has concluded).

In certain embodiments, CD process 20 may provide 214 an update to the previously provided 204 portion of the content. In certain embodiments, an update may be a limited update (i.e., may include only portions of the provided 204 portion of content that have changed since the content was provided 204). For example, if a moderator has changed only a single slide of a presentation, CD process 20 may provide 214 only the single slide (or the changes thereto) as an update to the previously provided 204 content. In certain embodiments, an update may be provided 214 based on receiving 206 an indication of a user's intent to participate in a meeting. For example, based on content associated with a meeting having been updated, an updated calendar invitation may be sent to desired participants, and updated content may be provided 214 based upon various users accepting the updated invitation. For example, after a user has accepted a calendar invitation to a meeting and identified 202 content has been provided 204 to a computing device associated with the user (e.g., the user's laptop, desktop, smart-phone, and so on), a moderator may alter certain aspects of the content. As such, in order to ensure that various users have access to the most up-to-date content, CD process 20 may provide 214 to the computing device to which the content was earlier provided 204 (and/or a different device) an update including the changes effected by the moderator.

In certain embodiments, updates may be provided 214 during an electronic meeting with which the updated content is associated. For example, if a presenter at an electronic meeting changes the participants' view in the meeting to a new slide and the new slide does not match slide content included in a user's local cache (e.g., as determined based upon comparison of metadata indicating the last-modified date, and so on), CD process 20 may cause an appropriate server (e.g., a server associated with a relevant EM and/or CS process) to push an update of that slide to the user's computing device (and/or another device). As also noted above, in certain embodiments, a provided 214 update may be a limited update (e.g., may represent any differences between the updated and previous versions of the content rather than the entire updated version of the content).

CD process 20 may provide 216, during the electronic meeting, a truncated instruction set for the display of a particular view of the provided 204 portion of content. For example, because content may have been provided 204 to a user's (and/or other) computing device in advance of that content forming part of a current electronic meeting view, it may be possible to facilitate a change in a user's view by providing 216 a truncated instruction set representing a reference to the locally stored (i.e., previously provided 204) content rather than transmitting the entire current view (or a differential representation thereof) to the user. For example, if the provided 204 content is a presentation and, during the electronic meeting the presenter has caused the presentation to advance from one slide to another (i.e., caused the meeting to advance from one view to another) CD process 20 may provide 216 to a computing device associated with the user/participant an instruction indicating such a change. Such an instruction may be provided 216, for example, as an alternative to providing the entire current slide or a differential representation thereof (i.e., because the current slide has already been provided 204, 210 to a storage device associated with a meeting participant). As such, such an instruction may be viewed as a truncated instruction set (i.e., because the resources immediately required to transmit such an instruction may be less than those required to transmit the entire current slide or a differential thereof). For example, if a presenter has advanced an electronic meeting presentation to slide 12 and the presentation has already been provided 204, 210 to participants of the meeting CD process may provide 216 a truncated instruction set such as "Conference ID: 78909, Action: Slide Change, Object: Slide 12." This truncated instruction set may, for example, represent that the presentation for the electronic meeting with ID number 78909 has been advanced to slide 12 and may prompt the display of slide 12 to conference participants based upon accessing the previously provided 204, 210 content.

In cases of protected content (e.g., content which a moderator has indicated may not be viewed prior to the meeting and/or during various other time frames, may be viewed only with restrictions, may be viewed only by certain users, and so on), the truncated instruction set may include permission information to authorize the display of a certain portion of content. In certain embodiments, a provided 216 truncated instruction set may, for example, include encryption key information and/or other information that allows the newly displayed content (e.g., the slide to which the presenter has advanced the current meeting presentation) to be displayed. For example, CD process 20 may provide 216 the truncated instruction set "Conference ID: 78909, Action: Slide Change, Object: Slide 12, Encryption key: #343AEF23432," thereby indicating that the presentation for the electronic meeting with ID number 78909 has been advanced to slide 12, and that the moderator has granted permission to view slide 12 (i.e., by providing the encryption key). This may, accordingly, prompt the display to conference participants of slide 12 based upon accessing the previously provided 204, 210 content.

In certain embodiments, receiving 206 an indication that the user intends to participate in the electronic meeting may include receiving 218 the indication after the start of the electronic meeting. For example, a user may accept an invitation to a meeting after the meeting has started, and/or may simply join a meeting that is already in progress with or without providing another indication that she intends to participate in the meeting.

In certain embodiments, where CD process 20 receives 218 an indication of intended participation after the start of a meeting, the user providing the indication may be provided with content through the real-time (or near real-time) transmission of bitmaps (and/or other representations) of the currently active meeting content. For example, when a meeting presentation is advanced to a new slide, a full bitmap image of the new slide may be provided to the participant who has just joined the meeting. In certain embodiments, however, CD process 20 may provide 204 a portion of meeting content in advance of that content being viewable through the meeting, even though the recipient user may have just indicated intent to participate in the meeting (e.g., by having just joined the meeting). For example, if a participant joins a meeting when a presentation has reached slide 13 of 72, CD process 20 may provide 204 to a computing device associated with that participant, slides 14 through 72 (and/or another portion) of the presentation. In this way, for example, when the moderator advances the presentation from slide 13 to 14, because slide 14 may have already been provided 204 to the participant's (or another local) device, CD process 20 may provide 216 a truncated instruction set for the slide transition, rather than, for example, a full bitmap of slide 14.

In certain embodiments, users may view meeting content in a hybrid of the above-noted ways. For example, continuing the example above, the moderator may advance the presentation from slide 13 to 14 and 14 to 15 before slides 14 and 15 have been fully provided 214 (e.g., for storage in a local cache) to a computing device associated with the newly-arrived participant. Accordingly, a representation of slides 14 and 15 (e.g., a bitmap of slide 14 and a bitmap of the differences between slides 14 and 15) may be transmitted to the computing device of the participant for display to the participant. By the time, however, that the moderator advances to slide 16, slide 16 may have been fully provided 204 to the computing device associated with the user (e.g., may be fully stored in a local cache). As such, CD process 20 may indicate the transition to slide 16 by providing 216 a truncated instruction set, rather than by transmitting a full (or differential) bitmap of slide 16.

The portion of content that may be provided 204 to a local (or other) computing device may vary depending on circumstance. For example, the timing, speed, and so on of providing 204 content may depend on current (and/or forecast) server loads, the nature and size of the content, the timing of the relevant electronic meeting (e.g., whether the meeting is about to start, does not start for several days, has been 10% concluded, has been 90% concluded, and so on) and various other factors. For example, continuing the example above, in certain embodiments, when a participant joins a meeting in the middle of a presentation, at first only the immediately relevant (e.g., the current slides, a number of subsequent slides, and/or a number of preceding slides) may be provided 204, in order, for example, to balance demands on relevant servers with the desirability of providing 204 content to a user's device before that content is viewable through the relevant electronic meeting.

The provided 204 portion of content may be stored in a variety of ways. For example, the portion of content may be stored by calendar application 220 (e.g., client CS application 44) associated with the calendar appointment with which the electronic meeting is associated. For example, CD process 20 may provide 204 a portion of content to a cache or other allocation of memory associated with calendar application 220. As such, for example, when a user is participating in the meeting (and/or otherwise viewing the provided 204 content), the content may be retrieved from the cache or other allocation of memory associated with calendar application 220 and displayed to the user (e.g., through a web browser or other consumption application). In certain embodiments, the portion of content may additionally/alternatively be stored as part of activities server 222, online community 224, wiki 226, team room 228 and/or another device, system, memory architecture and so on that is associated with the participant.

Figure 3:
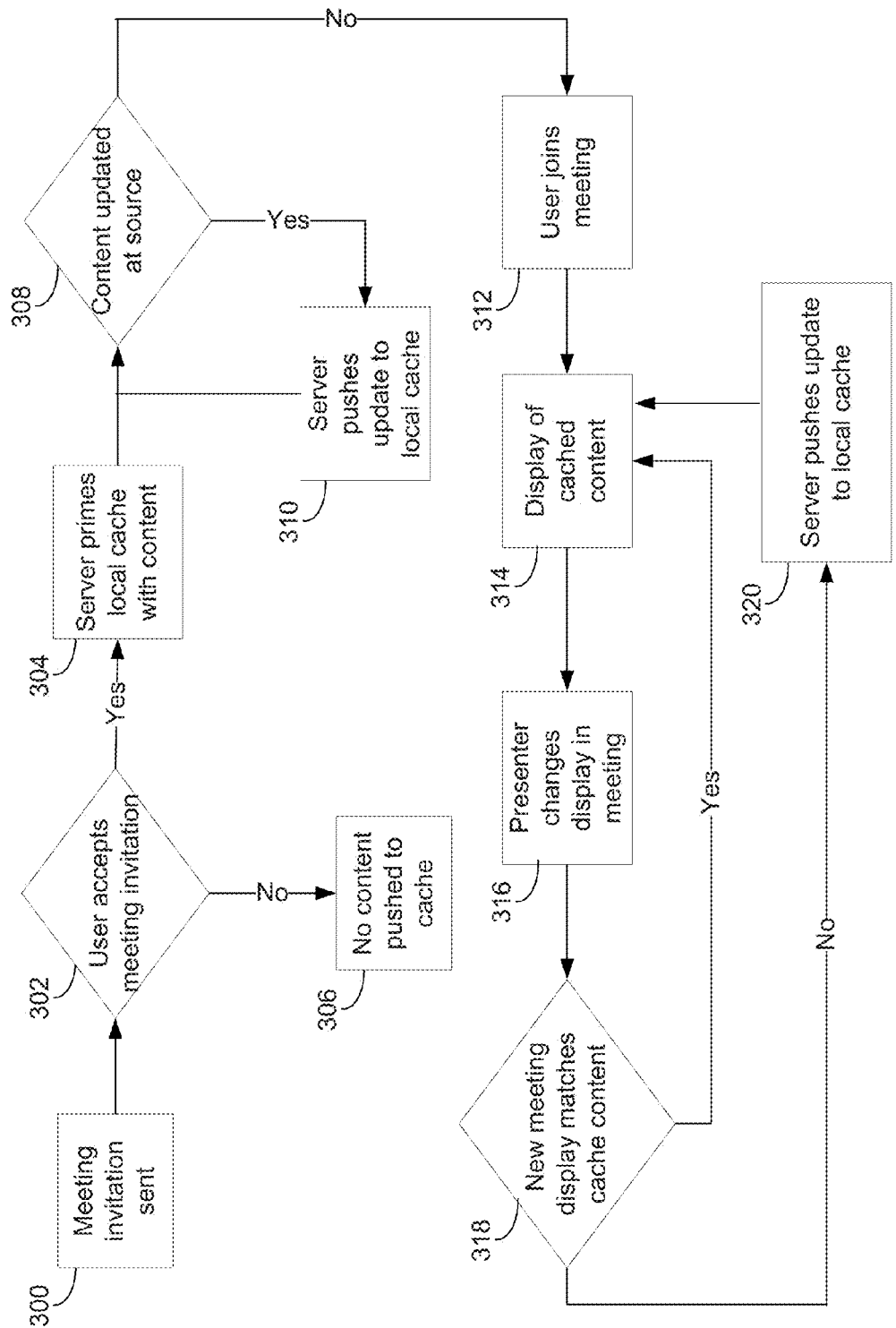
FIG. 3 is a flowchart of a process executed by the content delivery process of FIG. 1.

Referring now also to FIG. 3, a process executed by certain embodiments of CD process 20 is depicted. For example, invitation 300 for an electronic meeting may be sent to various potential participants (e.g., based on a list created by a moderator). CD process 20 may (e.g., based on input from a moderator) identify 202 that a particular presentation is associated with this meeting. For example, when creating (and/or editing) a calendar entry for an electronic meeting (e.g., using a CS application), a moderator may indicate that certain content files should be associated with the meeting and may make those files available to a server associated with the meeting (e.g., by uploading the files to the server or providing a link to the files' current location).

If a particular user accepts 302 the invitation 300, the server associated with the meeting (e.g., a server associated with an EM application that may facilitate the electronic meeting and/or a CS application that may facilitate management of the meeting invitations) may prime 304 a local cache associated with the particular user (i.e., the user who has accepted 302 the invitation) with the identified 202 content (e.g., presentation materials for the electronic meeting). If a particular user does not accept 302 the invitation, no content may be pushed 306 to the local cache (i.e., because the user is not expected to attend the meeting). In this way, for example, CD process 20 may advantageously provide 210 content in advance of a meeting (i.e., so that the content may be reviewed in advance of the meeting, so that server load associated with distributing the content is efficiently distributed, so that poor connectivity during the meeting does not affect delivery of content, and so on), but only to confirmed participants of the relevant meeting, thereby avoiding expenditure of server (and/or other resources) on providing content to users who may not intend to participate in the meeting.

In certain embodiments, after a user has accepted 302 an invitation and a server has primed 304 a local cache with meeting content, the content may be updated at its source (and/or elsewhere). For example, a presenter may add, delete and/or edit various slides included in a meeting presentation. Based on this update 308 and, for example, a user accepting 302 the meeting invitation, CD process 20 may cause a server (e.g., a server associated with an EM application that will facilitate the electronic meeting and/or a CS application that facilitates management of the meeting invitations) to push 310 an update of the content to the local cache.

In certain embodiments, such a user may then join 312 the meeting, participation in which may prompt the display 314 of the cached (or otherwise stored) meeting content (i.e., the content already provided 204 to a computing device associated with a meeting participant). As noted above, where the meeting content has been provided 204 before the content is to be viewed during a meeting, this may facilitate more efficient meeting communication because a server (e.g., a server associated with an EM application associated with the meeting) may not be required to push the entirety of meeting content to all participants during the actual meeting.

In certain embodiments, the content stored in a local cache associated with a CS application (i.e., a CS application through which an invitation to the meeting was accepted) may be provided to a cache associated with a browser, through which a user may be participating in the relevant electronic meeting. This may accordingly facilitate display of the current meeting content in the browser without requiring real-time (or near real-time) transmission of that content from an EM (and/or other) server to the browser. For example, CD process 20 may cause such an EM (and/or other) server simply to provide 216 a truncated instruction set to inform the display of the relevant content in the browser.

As also noted above, in certain embodiments, a user may provide an advance indication that she will join 312 a meeting (e.g., may accept 302 an associated meeting invitation in advance of the start of the meeting). In certain embodiments, a user may join 312 a meeting without providing an advance indication (e.g., may directly join 312 the meeting without accepting 302 an associated invitation). In such latter case, for example, the server may prime 304 the user's local cache with the content (and/or a portion thereof—e.g., the remaining slides in the ongoing meeting presentation) when the user joins 312 the meeting (i.e., rather than providing 210 the content in advance of the meeting), despite the user not having directly accepted 302 a meeting invitation through a CS application (or process) and/or otherwise indicated, before the meeting starts, an intention to participate in the meeting.

During the meeting, the presenter (and/or another administrator) may change 316 the display of the meeting content (e.g., may change 316 the view for participants in the meeting from one presentation slide to another presentation slide). When such a change 316 occurs, CD process 20 may, for example, determine whether the new display of meeting content matches 318 a display of content represented by a portion the local cache (i.e., by previously-provided 304 content). For example, CD process 20 may compare metadata indicating a last-modified date to determine whether a slide previously provided 204 to a local cache matches a slide that is currently being displayed as part of the electronic meeting. If a match 318 is determined, the cached (i.e., previously provided 204) content may be displayed 314 (e.g., based upon CD process 20 providing 216 a truncated instruction set for the change in the display).

If a match 318 between the previously provided 204 (e.g., locally cached) content and the currently displayed meeting content is not found, CD process 20 may cause a server associated with the EM application/process (and/or another server) to push 320 a content update to the participant's device (e.g., to a local cache) so that the updated content may be displayed 314. As also noted above, in this case (and others) the server may push 320 only the portion of the content that has been updated (and/or another portion of the content) to the local cache.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
    associating, by one or more computing devices, an electronic meeting with a calendar appointment;
    identifying, by the one or more computing devices, content associated with the electronic meeting;
    receiving, by the one or more computing devices, an indication that a user intends to participate in the electronic meeting after the start of the electronic meeting based upon, at least in part, the user joining in the electronic meeting;
    providing, by the one or more computing devices, a currently active portion of the content to a computing device associated with the user, wherein the currently active portion is based upon, at least in part, when the user joins in the electronic meeting;
    providing, by the one or more computing devices, a portion of the content of the currently active portion of the content to the computing device associated with the user based upon, at least in part, the user joining in the electronic meeting, wherein providing the portion of the content occurs during a time of low load for a server associated with providing the portion of the content, wherein the indication is associated with the calendar appointment, wherein the portion of the content provided to the computing device is a remaining portion of the content after the currently active portion, and excludes at least a portion of the content from before the user joins in the electronic meeting and providing, during the electronic meeting, to the computing device associated with the user, a truncated instruction set for the display, during the electronic meeting, of a view of the portion of the content from the storage device;
    caching, by the one or more computing devices, in a storage device, the portion of the content on the computing device associated with the user; and
    displaying, by the one or more computing devices, from the storage device, the portion of the content when the cached portion of the content becomes active content of the electronic meeting.

2. The computer-implemented method of claim 1, further comprising: providing, to the computing device associated with the user, an update to the portion of the content in the storage device.

3. The computer-implemented method of claim 1, wherein the portion of content from the storage device is stored by a calendar application associated with the calendar appointment.

4. The computer-implemented method of claim 1, wherein the portion of content from the storage device is stored as part of one or more of an activities server, an online community, a wiki, and a team room.

5. A computer-implemented method comprising:
    associating, by one or more computing devices, an electronic meeting with a calendar appointment;
    identifying, by the one or more computing devices, content associated with the electronic meeting;
    receiving, by the one or more computing devices, an indication that a user intends to participate in the electronic meeting after the start of the electronic meeting based upon, at least in part, the user joining in the electronic meeting;
    providing, by the one or more computing devices, a currently active portion of the content to a computing device associated with the user, wherein the currently active portion is based upon, at least in part, when the user joins in the electronic meeting;
    providing, by the one or more computing devices, a portion of the content of the currently active portion of the content to the computing device associated with the user based upon, at least in part, the user joining in the electronic meeting, wherein providing the portion of the content occurs during a time of low load for a server associated with providing the portion of the content, wherein the indication is associated with the calendar appointment, wherein the portion of the content provided to the computing device is a remaining portion of the content after the currently active portion, and excludes at least a portion of the content from before the user joins in the electronic meeting and providing, during the electronic meeting, to the computing device associated with the user, a truncated instruction set for the display, during the electronic meeting, of a view of the portion of the content from the storage device;

caching, by the one or more computing devices, in a storage device, the portion of the content on the computing device associated with the user;

displaying, by the one or more computing devices, from the storage device, the portion of the content when the cached portion of the content becomes active content of the electronic meeting; and automatically pushing, by the one or more computing devices, an update to the portion of the content directly to the portion of the content.

* * * * *